(12) United States Patent
Kuroda et al.

(10) Patent No.: US 11,046,203 B2
(45) Date of Patent: Jun. 29, 2021

(54) CAPACITOR STATE DISPLAY DEVICE FOR VEHICLE

(71) Applicant: HONDA MOTOR CO., LTD., Tokyo (JP)

(72) Inventors: Kazufumi Kuroda, Wako (JP); Hiroyuki Kurokawa, Wako (JP); Kotaro Higuchi, Wako (JP); Masaru Aoki, Wako (JP); Eiichi Hoshino, Wako (JP); Keisuke Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/585,505

(22) Filed: Sep. 27, 2019

(65) Prior Publication Data

US 2020/0101858 A1 Apr. 2, 2020

(30) Foreign Application Priority Data

Sep. 28, 2018 (JP) .............................. JP2018-185509

(51) Int. Cl.
*B60L 53/60* (2019.01)
*B60K 6/28* (2007.10)
(Continued)

(52) U.S. Cl.
CPC ............... *B60L 53/60* (2019.02); *B60K 6/28* (2013.01); *B60L 1/003* (2013.01); *B60L 3/12* (2013.01);
(Continued)

(58) Field of Classification Search
CPC .. B60L 3/12; B60L 53/60; B60L 1/003; B60L 58/12; G09G 5/02; G09G 2380/10;
(Continued)

(56) References Cited

U.S. PATENT DOCUMENTS 6,483,272 B1 * 11/2002 Terada .................. H02J 7/0069
320/103
2011/0057613 A1 * 3/2011 Taguchi .................. H04Q 9/00
320/109

(Continued)

FOREIGN PATENT DOCUMENTS

JP 2014-223010 A 11/2014
JP 6132011 B2 5/2017
WO 2012/081104 A1 6/2012

OTHER PUBLICATIONS

Office Action dated Jul. 7, 2020, issued in counterpart JP Application No. 2018-185509, with English translation (10 pages).

*Primary Examiner* — Jared Fureman
*Assistant Examiner* — Duc M Pham
(74) *Attorney, Agent, or Firm* — Westerman, Hattori, Daniels & Adrian, LLP

(57) ABSTRACT

Provided is a capacitor state display device for a vehicle displaying a capacitor state in the vehicle. The vehicle includes a capacitor to which electric power is supplied from an external charging facility, and a power consumption section consuming electric power supplied from the external charging facility or the capacitor. The capacitor state display device includes a display control section acquiring the capacitor state and a display section displaying images based on a command of the display control section. The display control section displays that electric power supplied from the external charging facility is being consumed by the power consumption section if electric power supplied from the external charging facility is being supplied to the power consumption section in a state that electric power is being supplied to the vehicle from the external charging facility.

18 Claims, 7 Drawing Sheets

(51) Int. Cl.
  *B60L 58/12* (2019.01)
  *B60L 1/00* (2006.01)
  *G07C 5/08* (2006.01)
  *B60L 3/12* (2006.01)
  *H02J 7/00* (2006.01)
  *G09G 5/377* (2006.01)
  *G09G 5/02* (2006.01)

(52) U.S. Cl.
  CPC ............ *B60L 58/12* (2019.02); *G07C 5/0825* (2013.01); *H02J 7/0047* (2013.01); *B60Y 2200/92* (2013.01); *B60Y 2300/91* (2013.01); *B60Y 2400/11* (2013.01); *G09G 5/02* (2013.01); *G09G 5/377* (2013.01); *G09G 2320/0666* (2013.01); *G09G 2340/12* (2013.01); *G09G 2380/10* (2013.01)

(58) Field of Classification Search
  CPC ..... G09G 2340/12; B60K 6/28; H02J 7/0047; B60Y 2300/91; B60Y 2400/11; B60Y 2200/92; G07C 5/0825
  See application file for complete search history.

(56) References Cited

U.S. PATENT DOCUMENTS

| | | | |
|---|---|---|---|
| 2014/0143702 A1 | 5/2014 | Matsuoka et al. | |
| 2016/0059720 A1 | 3/2016 | Yamamoto | |
| 2019/0225109 A1* | 7/2019 | Ono | B60L 3/0092 |

\* cited by examiner

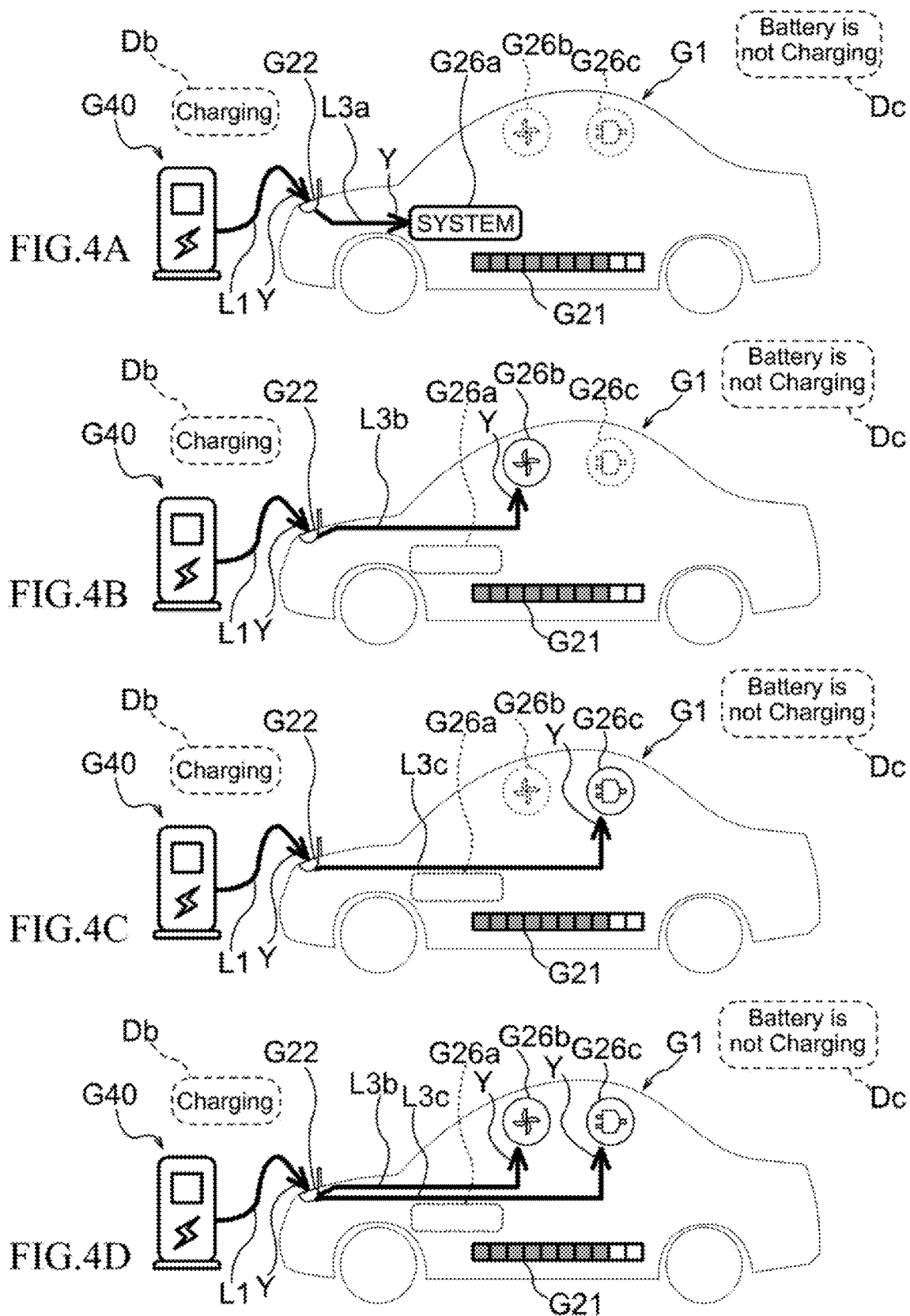

CAPACITOR STATE DISPLAY DEVICE FOR VEHICLE

CROSS-REFERENCE TO RELATED APPLICATION

The present disclosure contains subject matter related to Japanese Patent Application No. 2018-185509 filed on Sep. 28, 2018, the entire contents of which are incorporated herein by reference.

BACKGROUND OF THE INVENTION

Field of the Invention

The present invention relates to a capacitor state display device for a vehicle that informs a user of a state of a capacitor by displaying the state of the capacitor installed in the vehicle, and specifically relates to the capacitor state display device for the vehicle displaying the state of the capacitor chargeable from a charging facility being outside the vehicle.

Description of Related Art

Conventionally, there is a high-voltage battery (namely, capacitor) that is installed in a vehicle such as an electric-powered vehicle, etc. and charges via an on-vehicle charger from an external charging facility. Some high-voltage batteries are not only chargeable but also dischargeable. And, electric power output from these high-voltage batteries is converted by an inverter and a converter to be output to an output terminal such as an outlet (for instance, refer to Japanese Patent No. 6132011, i.e. Patent Document 1.). In Patent Document 1, an image of a plug for charging and an image of a plug for discharging are displayed separately in order to make clear whether the high-voltage battery is charging or discharging. This enables a user to clearly understand the capacitor state such as a charging state or a discharging state.

SUMMARY OF THE INVENTION

If electric power of the high-voltage battery is configured to be consumed by an air conditioner and an output terminal installed in the vehicle, a power consumption of the air conditioner and the output terminal may be large. In this case, even if the high-voltage battery, etc. is connected electrically to the external charging facility, and thus electric power is supplied from the external charging facility, all the electric power supplied from the external charging facility is consumed by the air conditioner, the output terminal, etc., possibly failing to charge the high-voltage battery.

However, also in this case, since the high-voltage battery is connected electrically to the external charging facility, the user necessarily thinks that the high-voltage battery is securely charging from the external charging facility. In this case, the user might fail to accurately grasp whether the high-voltage battery is being securely charged with electric power supplied from the external charging facility.

The present invention was made in view of an above-mentioned point, and the purpose is to provide a capacitor state display device for a vehicle that enables the user to accurately recognize a capacitor state by showing a flow of electric power from an external charging facility.

Means for Solving the Problem

In order to solve the above-described problems, a capacitor state display device for a vehicle in accordance with the present invention displays a state of a capacitor (21) in a vehicle (1) including the capacitor (21) to which electric power is supplied from an external charging facility (40) and a power consumption section (26) consuming electric power supplied from the external charging facility (40) or the capacitor (21). The capacitor state display device for the vehicle has a display control section (51) that acquires a state of the capacitor (21) in the vehicle (1) and a display section (52) that displays images on the basis of a command of the display control section (51). If electric power supplied from the external charging facility (40) is being supplied to the power consumption section (26) in the state that electric power is being supplied to the vehicle (1) from the external charging facility (40), the display control section (51) characteristically displays that electric power supplied from the external charging facility (40) is being consumed by the power consumption section (26).

In this manner, the display control section displays that electric power supplied from the external charging facility is being consumed by the power consumption section in the state that electric power is being supplied to the vehicle from the external charging facility, whereby the user can recognize that electric power supplied from the external charging facility is being consumed by the power consumption section. In general, in the state that the external charging facility is supplying electric power, the user tends to think that most of the electric power supplied from the external charging facility is being used for charging the capacitor. Under such circumstances, the displaying of the electric power supplied being consumed by the power consumption section enables the user to recognize that the electric power from charging the capacitor is not only being used for the external charging facility, but also being consumed in the power consumption section. Thus, the user can accurately recognize the capacitor state by being shown the power flow from the external charging facility.

In the above-described capacitor state display device for the vehicle, if no electric power from the external charging facility (40) is being supplied to the capacitor (21) in the state that the electric power is being supplied to the vehicle (1) from the external charging facility (40), the display control section (51) may display on the display section (52) that the capacitor (21) is not being charged with electric power supplied from the external charging facility (40).

In this manner, by displaying that the capacitor is not being charged with electric power supplied from the external charging facility in the state that electric power is being supplied to the vehicle from the external charging facility, the display control section can inform the user of no progress in charging of the capacitor even though the external charging facility and the capacitor are electrically connected, and electric power is being supplied to the vehicle from the external charging facility, for example, in the case of no increase in the residual capacity of the capacitor because of a large power consumption in the power consumption section.

In the above-described capacitor state display device for the vehicle, if electric power from the external charging facility (40) is being supplied to the power consumption section (26) and electric power from the capacitor (21) is being supplied to the power consumption section (26) in the state that electric power is being supplied from the external charging facility (40) to the vehicle (1), the display control section (51) may display on the display section (52) that the electric power supplied from the external charging facility (40) and the electric power supplied from the capacitor (21)

is being consumed in the power consumption section (26) and that the capacitor (21) is not charging.

In this manner, by displaying that electric power supplied from the external charging facility and electric power supplied from the capacitor is being consumed by the power consumption section and that the capacitor is not charging in the state that electric power is being supplied to the vehicle from external charging facility, the display control section enables the user to accurately grasp that there is no progress in charging of the capacitor because the power consumption section is consuming not only electric power of the external charging facility but also electric power of the capacitor even though the external charging facility and the capacitor are electrically connected, and electric power is being supplied to the vehicle from the external charging facility, for example, in the case of a significantly large power consumption in the power consumption section.

In the above-described capacitor state display device for the vehicle, the power consumption section (26) includes at least one of an electric controller (26a) for electrically controlling the vehicle (1), an air conditioner (26b) arranged in the vehicle (1) and an output terminal (26c) connectable to an external electrical apparatus. The display control section (51) may display on the display section (52) which of the electric controller (26a), the air conditioner (26b) and the output terminal (26c) included by the power consumption section (26) is consuming electric power.

In this manner, by displaying which of the electric controller, the air conditioner and the output terminal included by the power consumption section is consuming electric power in the case that electric power is consumed by the power consumption section, the display control section (51) enables the user to grasp specifically which auxiliary apparatus included by the power consumption section is consuming electric power.

In the above-described capacitor state display device for the vehicle, a first element image (G40) imitating the external charging facility (40), a second element image (G21) imitating the capacitor (21), a third element image (G26) imitating the power consumption section (26), and linear images (L1, L2, L3, L4) in a solid or dotted line connecting between two of the first element image (G40), the second element image (G21) and the third element image (G26) are displayable on the display section (52). The display control section (51) may show a power supply path by displaying the linear images (L1, L2, L3, L4) between each two of the element images (G40, G21, G26) on the display section (52).

Thus, the image imitating the external charging facility, the image imitating the capacitor, the image imitating the power consumption section and the linear images connecting between each two of these elements are displayed on the display section. In this manner, the displaying of the power supply path can visually show the user the power supply path.

In the above-described capacitor state display device for the vehicle, the power consumption section (26) may include at least one of the electric controller (26a) for electrically controlling the vehicle (1), the air conditioner (26b) arranged in the vehicle (1) and the output terminal (26c) connectable to the external electric apparatus. And, the third element image (G26) may include at least one of an electric controller image (G26a) indicating the electric controller (26a), an air conditioner image (G26b) indicating the air conditioner (26b) and an output terminal image (G26c) indicating the output terminal (26c).

In this manner, the displaying of the images corresponding to the specific elements of the power consumption section as the third element image on the display section can visually show the user specifically which element is consuming electric power.

In the above-described capacitor state display device for the vehicle, the display control section (51) may show by flashing the linear images (L1, L2, L3, L4), the state that electric power is being supplied.

Thus, the flashing of the linear images in order to show the state that electric power is being supplied can draw the user's attention to these linear images. Therefore, the user can easily grasp the power supply state.

In the above-described capacitor state display device for the vehicle, an arrow image (Y) is displayable on the display section (52). The display control section (51) may attach the arrow image (Y) to the linear images (L1, L2, L3, L4) so that the arrow image (Y) indicates a power supply direction.

In this manner, if the arrow image is attached to the linear images to show that electric power is being supplied, the user can easily grasp the power supply direction according to the direction indicated by this arrow image.

In the above-described capacitor state display device for the vehicle, the linear images (L1, L2, L3, L4) are displayed with a pattern (PT). The display control section (51) may display the linear images (L1, L2, L3, L4) so that the pattern (PT) moves along the power supply direction.

Thus, the move of the pattern enables the user to easily understand that the electric power is being supplied in the direction in which the pattern moves, and thus easily grasp the actual power supply direction.

In the above-described capacitor state display device for the vehicle, the pattern (PT) may be patterns (PT1, PT2, PT3) that are changed in color along the direction indicating the actual power supply direction.

Thus, the pattern, which are changed in color along the direction indicating the actual power supply, added to the linear images can raise the visibility of the linear image compared to those without any pattern.

In the above-described capacitor state display device for the vehicle, the pattern (PT) may be patterns (PT1, PT2, PT3), one or more of whose brightness, saturation and hue is/are changed along the direction indicating the actual power supply direction.

Thus, the pattern, one or more of whose brightness, saturation and hue is/are changed along the direction indicating the actual power supply direction, added to the linear images can raise the visibility of the linear image compared to those without any pattern.

In the above-described capacitor state display device for the vehicle, a vehicle image (G1) imitating the vehicle (1) is displayable on the display image (52). The display control section (51) may display on the display section (52), the first element image (G40) outside the vehicle image (G1) so that the linear images (L1, L2, L3) connecting between the first element image (G40) and the second element image (G21) or the third element image (G26) go from outside to inside of the vehicle image (G1).

In this manner, if the display control section displays the vehicle image so that the linear images connecting from the first element image to the second element image or to the third element image go from outside to inside of the vehicle image, how electric power is being supplied from the external charging facility outside the vehicle to the high-voltage battery or the power consumption section inside the vehicle can be represented visually.

In the above-described capacitor state display device for the vehicle, the vehicle (1) has a connecting port (22) electrically connecting the external charging facility (40) to the capacitor (21) or to the power consumption section (26). A fourth element image (G22) imitating the connecting port (22) is displayable on the display section (52). The display control section (51) may display the fourth element image (G22) on the display section (52) so that the linear images (L1, L2, L3) connecting between the first element image (G40) and the second element image (G21) or the third element image (G26) go through the fourth element image (G22).

In this manner, the displaying of the fourth element image imitating the connecting port can represent visually how electric power is being supplied to the vehicle via the connecting port.

In the above-described capacitor state display device for the vehicle, the second element image (G21) can be changed in color partially or entirely. The display control section (51) may change the capacitor (21) in color according to whether the capacitor (21) is charging or discharging.

Thus, the change in color of the second element image indicating the capacitor according to whether the capacitor is charging or discharging enables the user to easily recognize whether the capacitor is charging.

In the above-described capacitor state display device for the vehicle, the third element image (G26) is switchable between display and non-display, and the display control section (51) may display the third element image (G26) on the display section (52) if a power consumption in the power consumption section (26) is a predetermined amount or more.

Thus, the displaying of the third element image indicating the power consumption section only when a power consumption in the power consumption section is a predetermined amount or more allows the user to be unconscious of electric power being consumed by the power consumption section if one can say that there is a small power consumption in the power consumption section and no influence on charging of the capacitor.

In the above-described capacitor state display device for the vehicle, the display control section (51) may display information (D1) of time required for completing charging of the capacitor (21) on the display section (52) if the capacitor (21) is being charged with electric power supplied from the external charging facility (40).

In this manner, the displaying of the information of the time required for completing charging of the capacitor if the capacitor is charging can show the charging state of the capacitor from a temporal point of view, whereby the user can recognize the capacitor state more in detail.

In the above-described capacitor state display device for the vehicle, the display control section (51) may display information (D2) of residual capacity of the capacitor (21) on the display section (52).

In this manner, the displaying of the information of residual capacity of the capacitor enables numerical recognition of the residual capacity of the capacitor and accordingly more detailed recognition of the capacitor state.

In the above-described capacitor state display device for the vehicle, the vehicle (1) has an electric motor (3), whereby the display control section (51) may display on the display section (52), information (D3) of a travelable distance of the vehicle (1) if the electric motor (3) is driven by electric power of the capacitor (21).

Thus, the displaying of the information of the travelable distance of the vehicle if the electric motor is driven by electric power of the capacitor enables recognition of the residual capacity of the capacitor from a viewpoint of distance and accordingly more detailed recognition of the capacitor state.

It should be noted that the bracketed reference numerals are examples of the elements of the embodiment described later.

Effect of the Invention

According to the capacitor state display device for the vehicle in accordance with the present invention, the user can accurately recognize the capacitor state by being shown a power flow from the external charging facility.

BRIEF DESCRIPTION OF THE INVENTION

FIG. 4A is a view of a display example when no high-voltage battery is charging while electric power is being consumed by an electric controller;

FIG. 4B is a view of a display example when no high-voltage battery is charging while electric power is being consumed by an air conditioner;

FIG. 4C is a view of a display example when no high-voltage battery is charging while electric power is being consumed by an output terminal;

FIG. 4D is a view of a display example when no high-voltage battery is charging while electric power is being consumed by an air conditioner and an output terminal;

DESCRIPTION OF THE EMBODIMENTS

Figure 1:
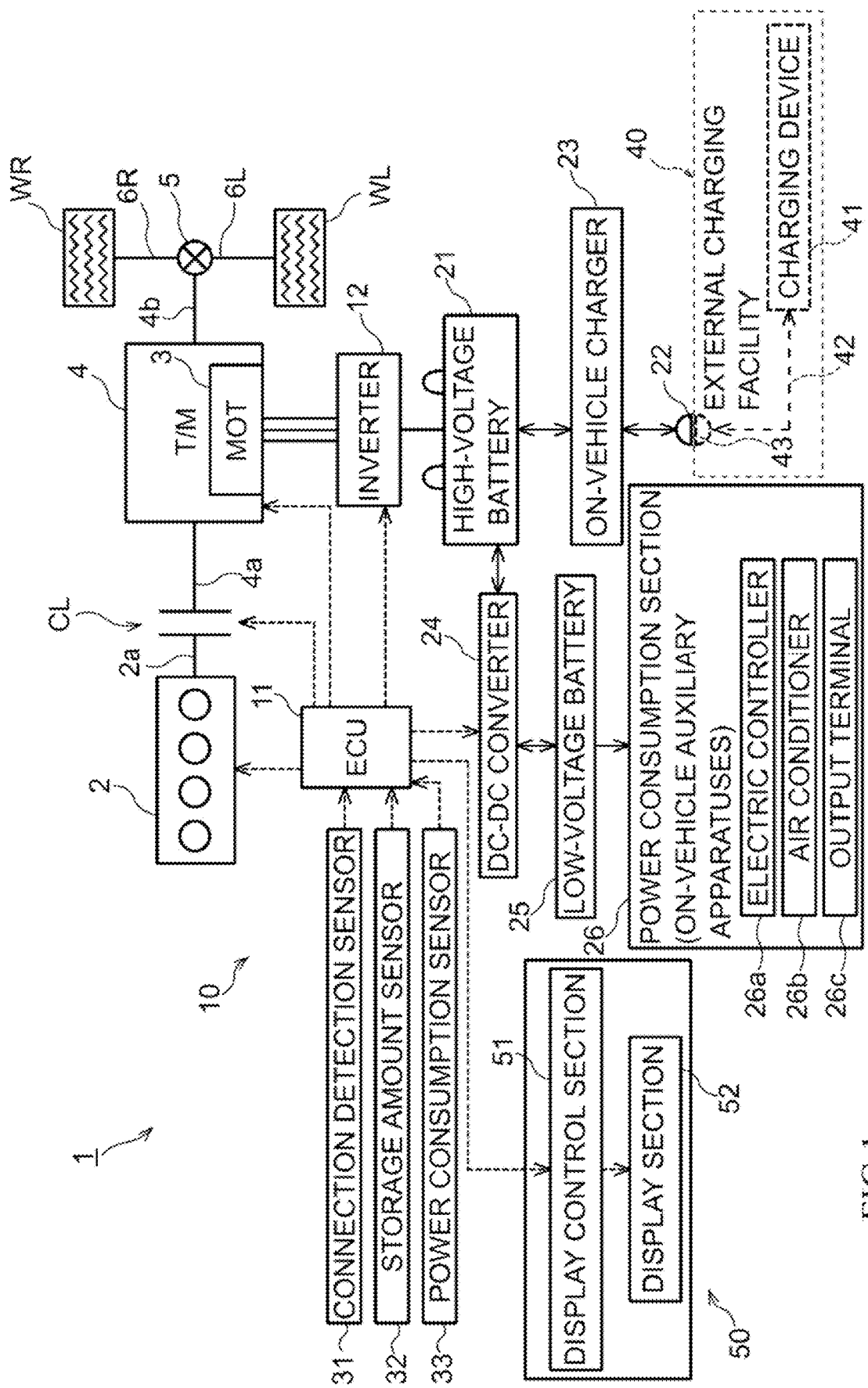
FIG. 1 is a schematic diagram illustrating an exemplary configuration of a vehicle provided with a capacitor state display device for the vehicle according to one embodiment of the present invention.

Hereinafter, an embodiment of the present invention will be described in detail with reference to the accompanying drawings. FIG. 1 is a schematic diagram illustrating an exemplary configuration of a vehicle provided with a capacitor state display device 50 for the vehicle according to one embodiment of the present invention. A vehicle 1 shown in FIG. 1 is a hybrid automobile provided with an engine (namely, internal combustion engine) 2 and a motor (namely, electric motor) 3 as driving sources.

The engine 2 mixes fuel with air to burn, thereby generating a rotational driving force for driving the vehicle 1. The motor 3 generates a rotational driving force to run the vehicle 1 by using electrical energy of a high-voltage battery (namely, a capacitor) 21. The motor 3 functions as a motor and, at a time of deceleration of the vehicle 1, as a generator for generating electric power because of regeneration of the motor 3. At the time of regeneration of the motor 3, the high-voltage battery 21 is charged with the electric power (namely, regeneration energy) generated by the motor 3.

Furthermore, the vehicle 1 includes an inverter 12 for controlling the motor 3, the high-voltage battery 21, a transmission 4, a differential mechanism 5, right and left drive shafts 6R, 6L and right and left driving wheels WR, WL. In addition, the engine 2 includes a crank shaft 2a, and the transmission includes an input shaft 4a. And, a clutch CL for adjusting power transmission to the input shaft 4a is arranged between the crank shaft 2a and the input shaft 4a. Here, the input shaft 4a and the clutch CL may be plural. In addition, an output shaft 4b is arranged between the transmission 4 and the differential mechanism 5.

This configuration allows the rotational driving force of the engine 2 and the motor 3 to be transmitted to the right and left drive wheels WR, WL via the input shaft 4a, the transmission 4, the output shaft 4b, the differential mechanism 5 and the drive shafts 6R, 6L.

The high-voltage battery 21 is not only charged with electric power generated by the motor 3 when the vehicle 1 is running, as described above, but also chargeable from the external charging facility 40 as an external power source when the vehicle 1 is parked. The external charging facility 40 has a charging device 41 serving as a power source, an outlet cable 42 leading electric power generated in the charging device 41 to the vehicle 1 and a charging connector 43 such as a plug. The vehicle 1 has a connecting port 22 connected to the charging connector 43 and an on-vehicle charger 23 that converts an alternating current supplied from the connecting port 22 into a direct current. According to this configuration, if the charging connector 43 is connected to the connecting port 22 to electrically connect the external charging facility 40 and the high-voltage battery 21 when the vehicle 1 is parked, electric power supplied from the external charging facility 40 is supplied via the connecting port 22 and the on-vehicle charger 23 to the high-voltage battery 21 so as to charge the high-voltage battery 21.

The vehicle 1 has a low-voltage battery 25 such as a 12V battery, etc. in addition to the high-voltage battery 21. The low-voltage battery 25 is connected via a DC-DC converter 24 from the high-voltage battery 21. The DC-DC converter 24 is, for example, an interactive DC-DC converter, which can lower an inter-terminal voltage of the high-voltage battery 21 or an inter-terminal voltage of the inverter 12 at the time of regenerating operation or boosting drive of the motor 3 to a predetermined voltage so as to charge the low-voltage battery 25. If the residual capacity (SOC) of the high-voltage battery 21 is falling, the DC-DC converter 24 can boost the inter-terminal voltage of the low-voltage battery 25 so a to charge the high-voltage battery 21.

The vehicle 1 has a power consumption, section 26 including on-vehicle auxiliary apparatuses, etc. installed in the vehicle 1. The power consumption section 26 of this embodiment includes at least an electric controller 26a for electrically controlling the vehicle 1, an air conditioner 26b arranged to the vehicle 1 and an output terminal (namely, outlet) 26c connectable to an external electrical apparatus. In addition, the on-vehicle auxiliary apparatuses also include an on-vehicle camera, communication and power transmission apparatuses, a car audio and accessory apparatuses thereof, a heater unit, a lighting device, etc. According to this configuration, the power consumption section 26 consumes electric power of the low-voltage battery 25 directly. Further, since the low voltage battery 25 is charged with electric power of the high-voltage battery 21, the power consumption section 26 can be said to consume electric power of the high-voltage battery 21 indirectly via the low-voltage battery 25.

Moreover, the vehicle 1 has a control device 10 provided with an electronic control unit (ECU) 11. The electronic control unit 11 controls the engine 2, the motor 3, the transmission 4, the differential mechanism 5, the inverter 12, the high-voltage battery 21, the DC-DC converter 24, the low voltage battery 25, etc. According to this configuration, the electronic control unit 11 controls charging and discharging of the high-voltage battery 21 and the low-voltage battery 25, a shifting operation of the transmission 4, etc., as well as the engine 2 and the motor 3.

Further, various control signals of a plurality of control parameters are input to the electronic control unit 11. For example, the control signals include a stepping amount of an accelerator pedal, a stepping amount of a brake pedal, a shift position of a gear stage, a steering angle of a steering wheel, a speed of the vehicle 1, etc., none of which is shown in the figure. In this embodiment, the control signals include a detected result from a connection detection sensor 31 detecting that the charging connector 43 has been connected to the connecting port 22, a power storage amount from a power storage amount sensor 32 measuring a power storage amount (SOC: State of Charge) of the high-voltage battery 21 and the low-voltage battery 25, a detected value from a power consumption sensor 33 measuring a power consumption of the power consumption section 26, etc. The electronic control unit 11 controls the vehicle 1 on the basis of information from these sensors.

Further, the vehicle 1 has a capacitor state display device 50 for the vehicle that displays a state of the high-voltage battery 21 installed in the vehicle 1. The capacitor state display device 50 for the vehicle has a display control section 51 that acquires a state of the high-voltage battery 21 in the vehicle 1 from the electronic control unit 11 and a display section 52 that displays images on the basis of a command from the display control section 51. In this configuration, the display control section 51 selects an image and information to be displayed on the display section 52 according to a charging state of the high-voltage battery 21 and a consuming state of electric power consumed in the power consumption section 26 transmitted from the electronic control unit 11 to the display control section 51. Details of displayed images and information will be described below.

Figure 2A:
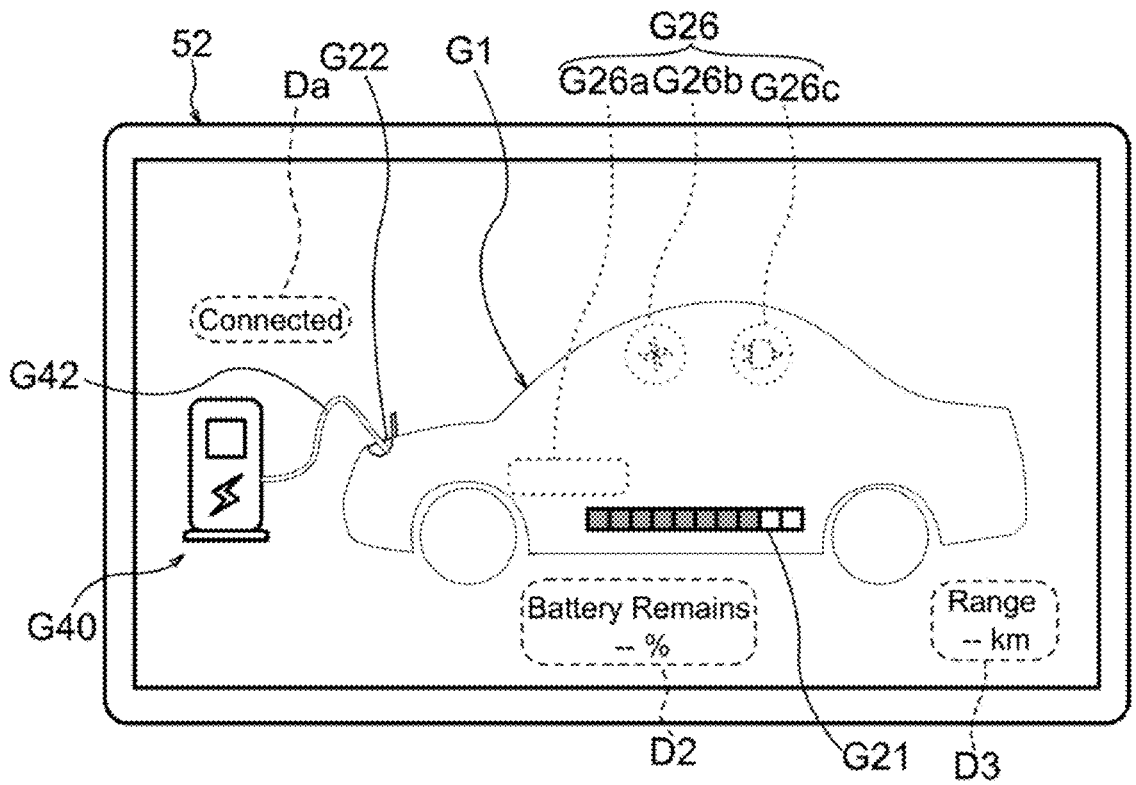
FIG. 2A is a view illustrating display items on a display section before starting to charge from an external charging facility.
Figure 2B:
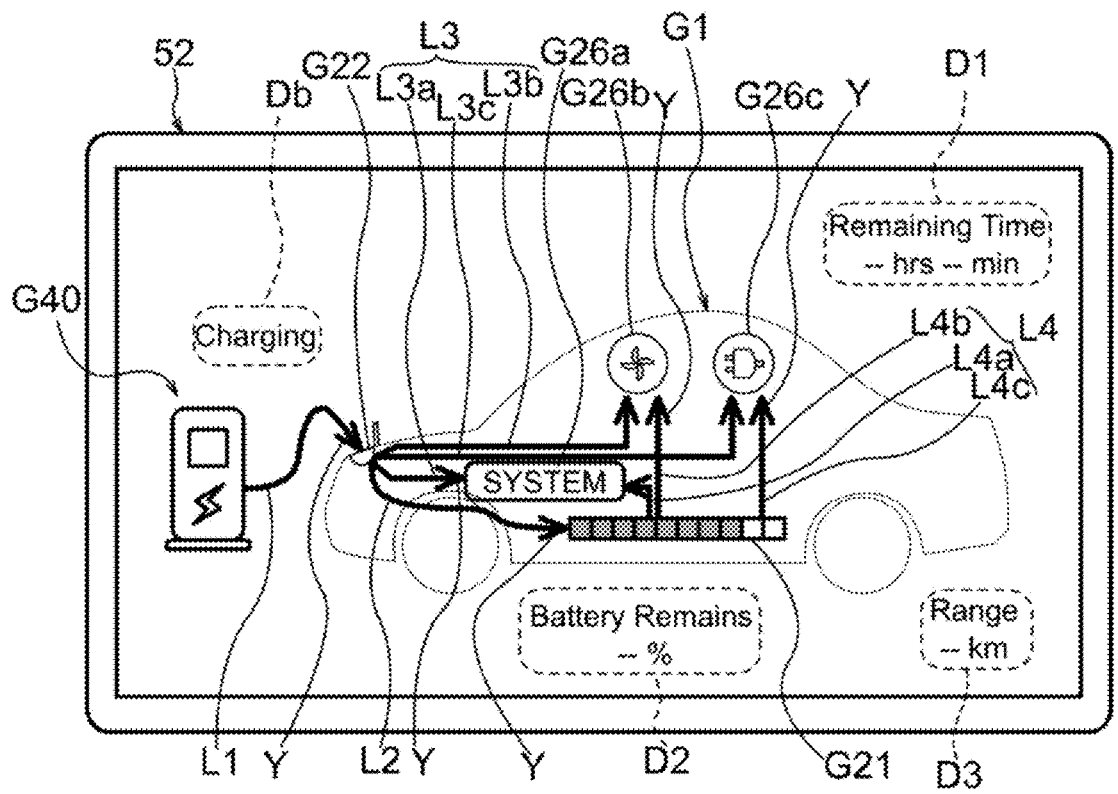
FIG. 2B is a view illustrating display items on a display section during charging from an external charging facility.

An outline of images and information displayed on the display section 52 by the display control section 51 of the capacitor state display device 50 for the vehicle will be described with reference to FIGS. 2A and 2B. FIGS. 2A and 2B are views of display items on the display section 52 in accordance with this embodiment. FIG. 2A shows display items on the display section 52 before starting charging by using the external charging facility 40. FIG. 2B shows display items on the display section 52 during charging by using the external charging facility 40.

As illustrated in FIG. 2A, a vehicle image G1 imitating the vehicle 1, a charging device image G40 (first element image) imitating the charging device 41 of the external charging facility 40, a high-voltage battery image G21 (second element image) imitating the high-voltage battery 21 and a power consumption section image G26 (third element image) imitating the power consumption section 26 are displayable on the display section 52. The power consumption section image G26 of this embodiment has an electric controller image G26a imitating the electric controller 26a and an air conditioner image G26b imitating the air conditioner 26b and an output terminal image G26c imitating the output terminal 26c. The charging device image G40 is displayed outside the vehicle image G1, and the high-voltage battery image G21 and part or whole of the power consumption section image G26 are displayed inside the vehicle image G1.

FIG. 2A shows a state of the outlet cable 42 of the external charging facility 40 being connected to the connecting port 22 of the vehicle 1 prior to electric power supply from the external charging facility 40. In this case, as the power consumption section 26 consumes no electric power from the external charging facility 40, the power consumption section image G26 is not displayed. Alternatively, while the power consumption section image G26 is displayed, brightness and saturation thereof is low so as not to be easily visible to the user. In the following description, the state that the power consumption section image G26 is not displayed includes this state that the power consumption section image G26 is displayed so as not to be easily visible.

A connecting port image G22 (fourth element image) imitating the connecting port 22 of the vehicle 1 and an outlet cable image G42 imitating the outlet cable 42 are displayable on the display section 52. The connecting port image G22 is displayed at a position dividing the vehicle image G1 into inside and outside. The displaying of the outlet cable image G42 so as to be connected to the connecting port image G22 can visually represent the state that the outlet cable 42 is connected to the connecting port 22.

Moreover, when the outlet cable 42 is connected to the connecting port 22, information Da to the effect that the outlet cable 42 is connected to the connecting port 22 is displayed on the display section 52.

As illustrated in FIG. 2B, linear images L1, L2, L3, L4 in a solid or dotted line are displayable on the display section 52. The linear images L1, L2, L3, L4 connect between two of the three element images of the charging device image G40, the high-voltage battery image G21 and the power consumption section image G26. The linear image L1 connects between the charging device image G40 and the connecting port image G22. The linear image L2 connects between the connecting port image G22 and the high-voltage battery image G21. The linear image L3 connects between the connecting port image G22 and the power consumption section image G26. The linear image L4 connects the high-voltage battery image G21 and the power consumption section image G26. Thus, these illustrate a power supply path in the state that power is being supplied to the vehicle 1 from the external charging facility 40. Next, the connections of the linear images will be described in more detail.

The charging device image G40 and the high-voltage battery G21 are connected by the linear images L1, L2. This can represent how electric power is being supplied from the external charging facility 40 to the connecting port 22 and, via the connecting port 22, to the high-voltage battery 21.

The charging device image G40 and the power consumption section image G26 are connected by the linear images L1, L3. This can represent how electric power is being supplied from the external charging facility 40 via the connecting port 22 to the power consumption section 26. Here, starting from the connecting port image G22, the linear image L3 of this embodiment has a linear image L3a leading to the electric controller image G26a, a linear image L3b leading to the air conditioner image G26b and a linear image L3c leading to the output terminal image G26c.

The high-voltage battery image G21 and the power consumption section image G26 are connected by the linear image L4. This can represent how electric power is supplied from the high-voltage battery 21 to the power consumption section 26. Here, staring from the high-voltage battery image G21, the linear image L4 of this embodiment has a linear image L4a leading to the electric controller image G26a for the electric controller 26a, a linear image L4b leading to the air conditioner image G26b and an linear image L4c leading to the output terminal image G26c.

Further, an arrow image Y displayable on the display section 52 is attached to the linear images L1, L2, L3, L4. Accordingly, a transmission path of electric power is indicated by the linear images L1, L2, L3, L4, and a transmission direction of electric power is indicated by a direction indicated by the arrow image Y.

Moreover, when electric power of the external charging facility 40 is being consumed by the power consumption section 26, the power consumption section image G26 is displayed as illustrated in FIG. 2B. Consequently, the power consumption section image G26 is switchable between display and non-display according to whether electric power is being consumed by the power consumption section 26. Further, the display control section 51 may display the power consumption section image G26 when a power consumption in the power consumption section 26 is a predetermined amount or more.

When the high-voltage battery 21 is being charged with electric power supplied from the external charging facility 40, the display control section 51 displays on display section 52, information D1 of time required for completing charging of the high-voltage battery 21, information D2 of the residual capacity of the high-voltage battery 21 and information D3 of a travelable distance of the vehicle 1 if the motor 3 is driven by electric power of the high-voltage battery 21. In addition, when electric power is being supplied to the vehicle 1 from the external charging facility 40, information Db indicating that electric power is being supplied to somewhere in the vehicle 1 is displayed on the display section 52.

It should be noted that on the display section 52, the high-voltage battery image G21 is changeable wholly or partially in color or pattern. And, the display control section 51 can change the high-voltage battery image G21 in color or pattern according to whether the high-voltage battery 21 is charging or discharging. Here, not only in color and pattern, but also the high-voltage battery image G21 itself may be changed.

Specific display patterns on the display section 52 will be exemplified with reference to FIGS. 3A to 3D, FIGS. 4A to 4D and FIGS. 5A to 5D. In these figures, only display items on the display section 52 are shown, omitting the display section 52 itself. And, the information D1, D2, D3, Da, Db is omitted unless it is necessary.

Figure 3A:
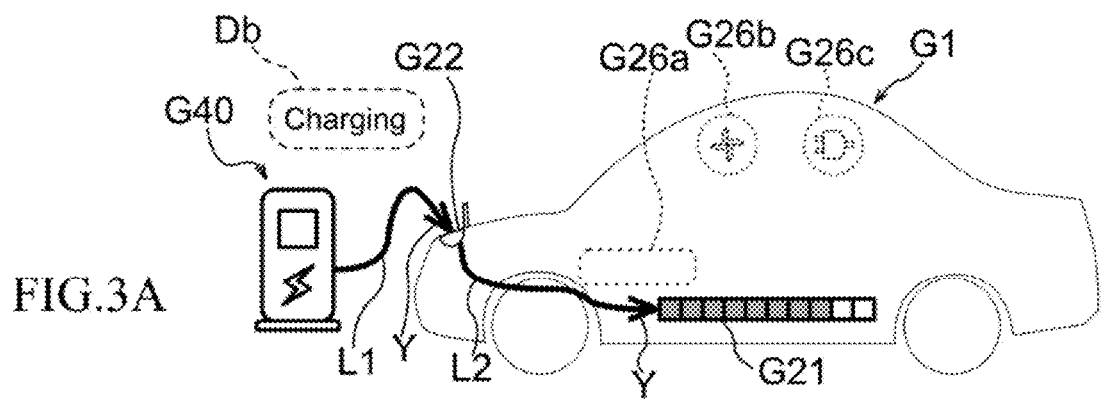
FIG. 3A is a view of a display example when a high-voltage battery is charging while no electric power is being consumed by a power consumption section.
Figure 3B:
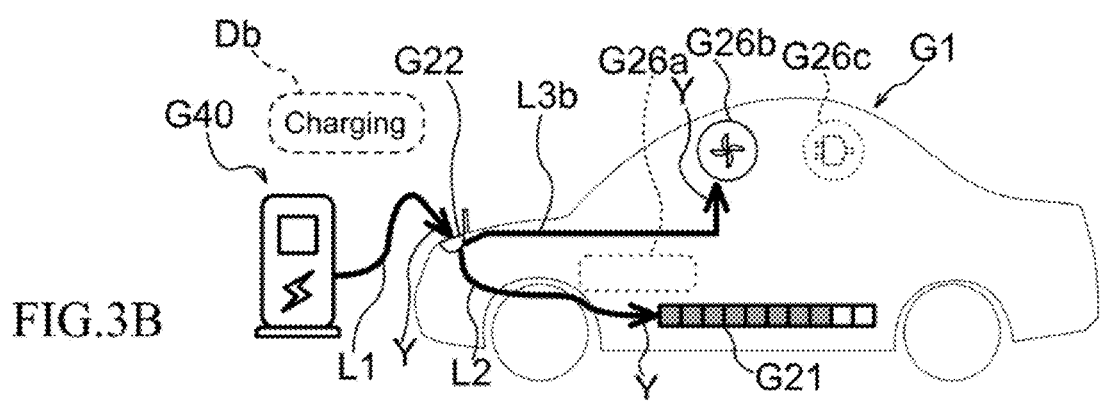
FIG. 3B is a view of a display example when a high-voltage battery is charging while electric power is being consumed by an air conditioner.
Figure 3C:
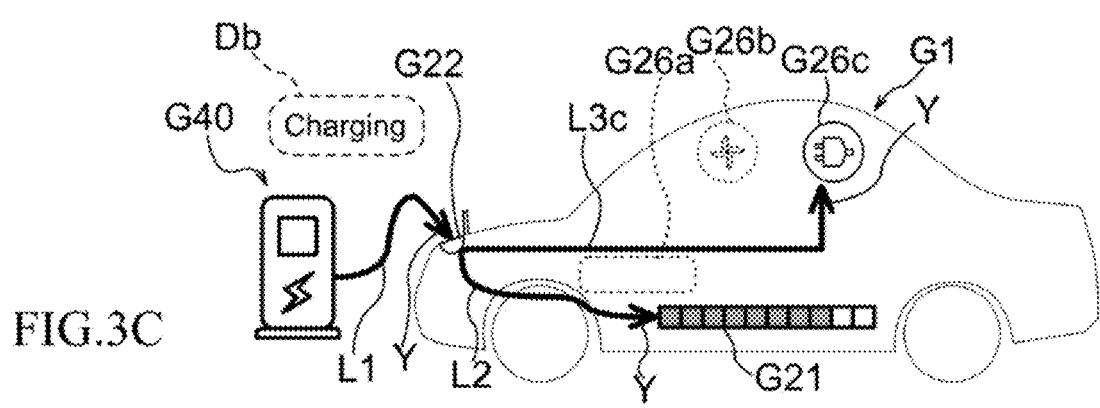
FIG. 3C is a view of a display example when a high-voltage battery is charging while electric power is being consumed by an output terminal.
Figure 3D:
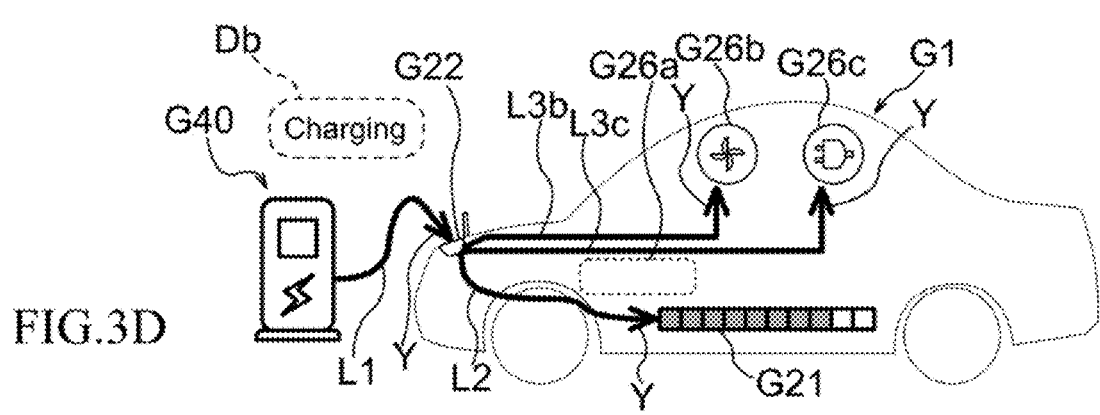
FIG. 3D is a view of a display example when a high-voltage battery is charging while electric power is being consumed by an air conditioner and an output terminal.

Display examples when the high-voltage battery 21 is charging while electric power of the external charging facility 40 is being supplied to the vehicle 1 will be described with reference to FIGS. 3A to 3D. FIGS. 3A to 3D are views illustrating display examples when the high-voltage battery 21 is charging. FIG. 3A is a view of a display example when no electric power is consumed by the power consumption section 26. FIG. 3B is a view of a display example when electric power is consumed by the air conditioner 26b. FIG. 3C is a view of a display example when electric power is consumed by the output terminal 26c. FIG. 3D is a view of a display example when electric power is consumed by the air conditioner 26b and the output terminal 26c.

In the case, as shown in FIGS. 3A to 3D, that electric power is being supplied to the vehicle 1 from the external charging facility 40, the information Db is displayed to indicate that electric power is being supplied to somewhere in the vehicle 1. As electric power supplied from the external charging facility 40 is being supplied to the high-voltage battery 21, the linear images L1, L2 connect between the charging device image G40 and the high-voltage battery image G21.

If electric power is being consumed by none of the power consumption section 26, as shown in FIG. 3A, (including when a power consumption in the power consumption section 26 is less than a predetermined amount. The same will apply hereinafter), the power consumption section image G26 is not displayed on the display section 52.

If electric power is being consumed by the air conditioner 26b, as shown in FIG. 3B, (namely, when a power consumption is a predetermined amount or more. The same will apply hereinafter), only the air conditioner image G26b of the power consumption section image G26 is displayed. And, the linear images L1, L3b connect between the charging device image G40 and air conditioner image G26b. As the arrow images Y attached to the linear images L1, L3b point to the air conditioner image G26b from the charging device image G40, the user understands that electric power is being supplied to the air conditioner 26b from the external charging facility 40.

As shown in FIG. 3C, when electric power is being consumed by the output terminal 26c, only the output terminal image G26c of the power consumption section image G26 is displayed. And, the linear images L1, L3c connect between the charging device image G40 and the output terminal image G26c. As the arrow images Y attached to the linear images L1, L3c point to the output terminal image G26c from the charging device image G40, the user understands that electric power is being supplied to the output terminal 26c from the external charging facility 40.

As shown in FIG. 3D, when electric power is being consumed by the air conditioner 26b and the output terminal 26c, the air conditioner image G26b and the output terminal image G26c of the power consumption section image G26 are displayed. And, the linear images L1, L3b connect between the charging device image G40 and the air conditioner image G26b, and the linear images L1, L3c connect between the charging device image G40 and the output terminal image G26c. Since the arrow images Y attached to the linear images L1, L3b point to the air conditioner image G26b from the charging device image G40, and the arrow images Y attached to the linear images L1, L3c point to the output terminal image G26c from the charging device image G40, the user understands that electric power is being supplied to the air conditioner 26b and the output terminal 26c from the external charging facility 40.

In this manner, when electric power supplied from the external charging facility 40 is being supplied to the power consumption section 26, the display control section 51 displays on the display section 52, that electric power supplied from the external charging facility 40 is being consumed by the power consumption section 26. In addition, the display control section 51 also displays which of the power consumption section 26 is consuming electric power, namely, the electric controller 26a, the air conditioner 26b and the output terminal 26c.

Display examples when the high-voltage battery 21 is not charging in spite that electric power of the external charging facility 40 is being supplied to the vehicle 1 will be described with reference to FIGS. 4A to 4D. FIGS. 4A to 4D are views of display examples when the high-voltage battery 21 is not charging. FIG. 4A is a view of a display example when electric power is being consumed by the electric controller 26a. FIG. 4B is a view display example when electric power is being consumed by the air conditioner 26b. FIG. 4C is a view of display example when electric power is being consumed by the output terminal 26c. FIG. 4D is a view of display example when electric power is being consumed by the air conditioner 26b and the output terminal 26c.

In FIGS. 4A to 4D, since electric power is being supplied to the vehicle 1 from the external charging facility 40 while the high-voltage battery 21 is not charging, the display control section 51 displays information Db indicating that electric power is being supplied to somewhere in the vehicle 1.

Additionally, when the high-voltage battery 21 is not charging (namely, in the case of no increase in the residual capacity of the high-voltage battery 21), the display control section 51 displays on the display section 52 information Dc indicating that the high-voltage battery 21 is not charging. In this case, the linear image L2 connecting between the connecting port image G22 and the high-voltage battery image G21 is not displayed. Consequently, the user understands that no electric power is being supplied to the high-voltage battery 21 from the external charging facility 40, and therefore the high-voltage battery 21 is not charging.

Thus, when no electric power is being supplied from the external charging facility 40 to the high-voltage battery 21 while electric power is being supplied from the external charging facility 40 to the vehicle 1 (namely, in the case of no increase in residual capacity), the display control section 51 displays the information Dc and hides the linear image L2 on the display section 52. Consequently, the user can easily recognize that the high-voltage battery 21 is not charging.

As shown in FIG. 4A, when electric power is being consumed only by the electric controller 26a, only the electric controller image G26a showing the electric controller 26a of the power consumption section image G26 is displayed. And, the linear images L1, L3a connect between the charging device image G40 and the electric controller image G26a. Since the arrow images Y attached to the linear images L1, L3a point to the electric controller image G26a from the charging device image G40, the user understands that electric power is being supplied from the external charging facility 40 to the electric controller 26a.

As shown in FIG. 4B, if the electric power is being consumed only by the air conditioner 26b, only the air conditioner image G26b indicating the air conditioner 26b of the power consumption section image G26 is displayed. And, the linear images L1, L3b connect between the charging device image G40 and the air conditioner image G26b. Since the arrow images Y attached to the linear images L1, L3b point to the air conditioner image G26b from the charging device image G40, the user understands that electric power is being supplied from the external charging facility 40 to the air conditioner 26b.

As shown in FIG. 4C, when electric power is being consumed only by the output terminal 26c, only the output terminal image G26c of the power consumption section image G26 is displayed. And, the linear images L1, L3c connect between the charging device image G40 and the output terminal image G26c. The arrow images Y attached to the linear images L1, L3c point to the output terminal image G26c from the charging device image G40, the user understands that electric power is being supplied from the external charging facility 40 to the output terminal 26c.

As shown in FIG. 4D, when electric power is being consumed by the air conditioner 26b and the output terminal 26c, the air conditioner image G26b and output terminal image G26c of the power consumption section image G26 are displayed. And, the linear images L1, L3b connect between the charging device image G40 and the air conditioner image G26b, and the linear images L1, L3c connect between the charging device image G40 and the output terminal image G26c. The arrow images Y attached to the linear images L1, L3b, L3c point to the air conditioner image G26b and the output terminal image G26c from the charging device image G40, the user understands that electric power is being supplied to air conditioner 26b and output terminal 26c from the external charging facility 40.

Display examples displayed on the display section 52 when a power consumption in the power consumption section 26 is significantly large will be described with reference to FIGS. 5A to 5D. A display example when the high-voltage battery 21 is not charging in spite that electric power of the external charging facility 40 is being supplied to the vehicle 1, and electric power of the high-voltage battery 21 is being consumed in the power consumption section 26 will be described.

Figure 5A:
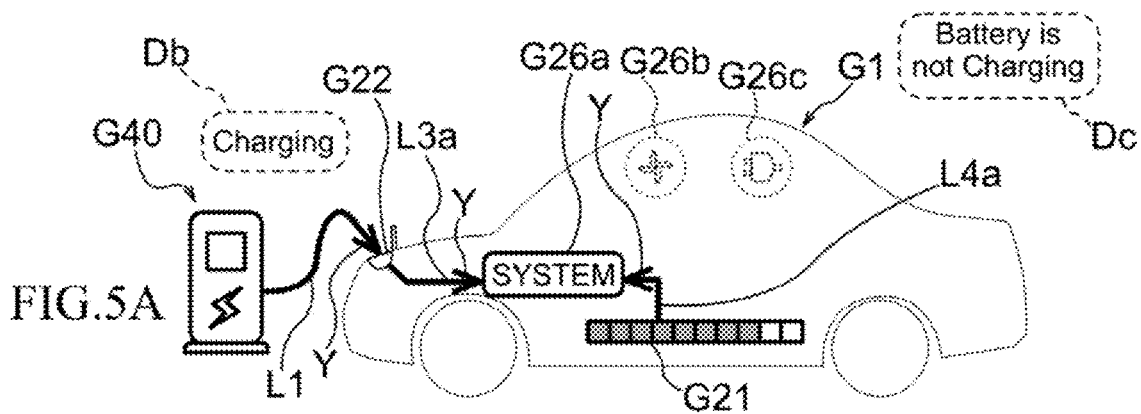
FIG. 5A is a view of a display example when no high-voltage battery is charging and a high-voltage battery is discharging while electric power of an external charging facility and electric power of the high-voltage battery is being consumed by an electric controller.
Figure 5B:
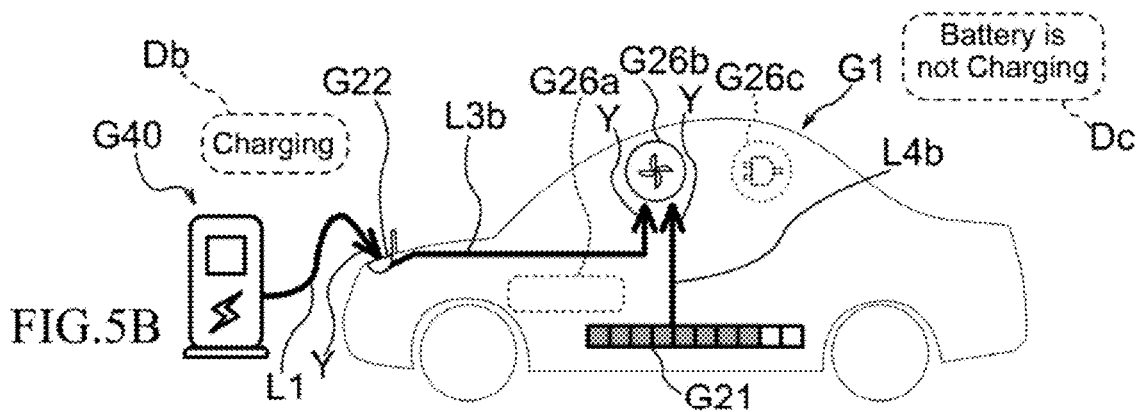
FIG. 5B is a view of a display example when no high-voltage battery is charging and a high-voltage battery is discharging while electric power of an external charging facility and electric power of the high-voltage battery is being consumed by an air conditioner.
Figure 5C:
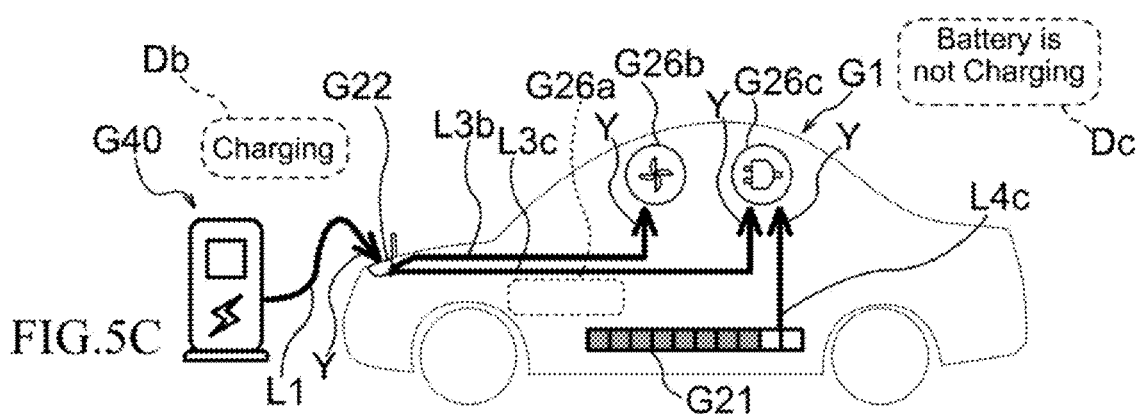
FIG. 5C is a view of a display example when no high-voltage battery is charging and a high-voltage battery is discharging while electric power of an external charging facility is being consumed by an air conditioner, and electric power of the external charging facility and electric power of the high-voltage battery is being consumed by an output terminal.
Figure 5D:
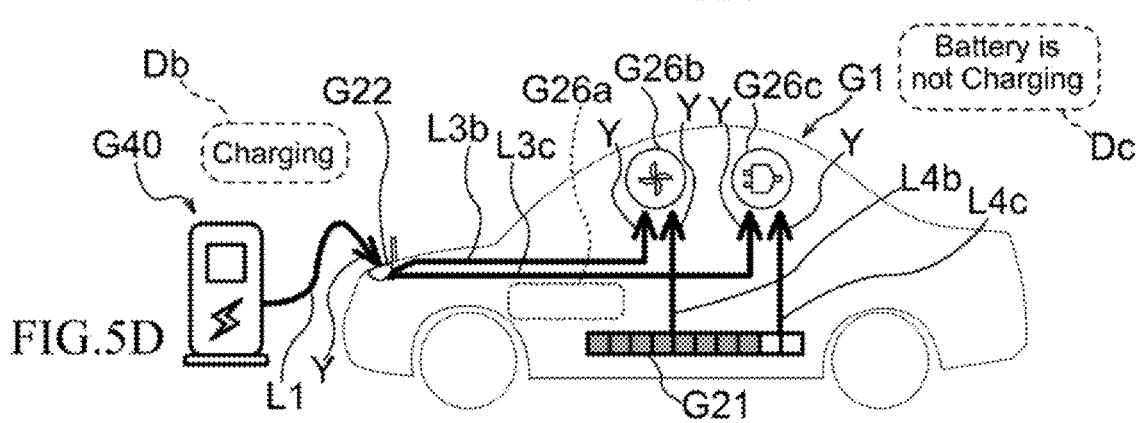
FIG. 5D is a view of display example when no high-voltage battery is charging and a high-voltage battery is discharging while electric power of an external charging facility and electric power of the high-voltage battery is being consumed by an air conditioner and an output terminal.

FIGS. 5A to 5D are views of display examples when the high-voltage battery 21 is not charging but discharging. FIG. 5A is a view of a display example when electric power of the external charging facility 40 and electric power of the high-voltage battery 21 is being consumed by the electric controller 26a. FIG. 5B is a view of a display example when electric power of the external charging facility 40 and electric power of the high-voltage battery 21 is being consumed by the air conditioner 26b. FIG. 5C is a view of a display example when electric power of the external charging facility 40 is being consumed by the air conditioner 26b, and electric power of the external charging facility 40 and electric power of the high-voltage battery 21 is being consumed by the output terminal 26c. FIG. 5D is a view of a display example when electric power of the external charging facility 40 and electric power of the high-voltage battery 21 is being consumed by the air conditioner 26b and the output terminal 26c.

In FIGS. 5A to 5D, since electric power is being supplied to the vehicle 1 from the external charging facility 40 while the high-voltage battery 21 is not charging, the information Db is displayed, indicating that electric power is being supplied to somewhere in the vehicle 1.

Additionally, when the high-voltage battery 21 is not charging (namely, in the case of no increase in the residual capacity of the high-voltage battery 21), the information Dc is displayed on the display section 52, indicating that the high-voltage battery 21 is not charging. In this case, the linear image L2 connecting between the high-voltage battery image G21 and the connecting port image G22 is not displayed. Accordingly, the user understands that no electric power is being supplied to the high-voltage battery 21 from the external charging facility 40, and thus that the high-voltage battery 21 is not charging.

In this manner, when no electric power supplied from the external charging facility 40 is supplied to the high-voltage battery 21 while electric power is being supplied from the external charging facility 40 to the vehicle 1 (namely, in the case of no increase in residual capacity), the display control section 51 displays, the information Dc indicating no charging and hides the linear image L2 on the display section 52. Consequently, the user can easily recognize that the high-voltage battery 21 is not charging.

Moreover, as described above, the display control section 51 can change the high-voltage battery image G21 in color or pattern according to whether the high-voltage battery 21 is charging or discharging. In the state that the images in FIGS. 5A to 5D are displayed, the high-voltage battery 21 is discharging. Therefore, the high-voltage battery image G21 in FIGS. 5A to 5D is different in color or pattern from the high-voltage battery image G21 when the high-voltage battery 21 is charging (See FIGS. 3A to 3D.).

As shown in FIG. 5A, when electric power is being consumed only by the electric controller 26a, only the electric controller image G26a, of the power consumption section image G26, indicating the electric controller 26a is displayed. And, the linear images L1, L3a connect between the charging device image G40 and the electric controller image G26a. Since the arrows image Y attached to the linear image L1, L3a point to the electric controller image G26a from the charging device image G40, the user understands that electric power is being supplied to the electric controller 26a from the external charging facility 40. Additionally, the linear image L4a connects between the high-voltage battery image G21 and the electric controller image G26a. Since the arrow image Y attached to the linear image L4a points to the electric controller image G26a from the high-voltage battery image G21, the user understands that electric power is being supplied to the electric controller 26a from the high-voltage battery 21.

As shown in FIG. 5B, only the air conditioner image G26b of the power consumption section image G26 is displayed when electric power is being consumed only by the air conditioner 26b. And, the linear images L1, L3b connect between the charging device image G40 and the air conditioner image G26b. Since the arrows image Y attached to the linear images L1, L3b point to the air conditioner image G26b from the charging device image G40, the user understands that electric power is being supplied to the air conditioner 26b from the external charging facility 40. Additionally, the linear image L4b connects between the high-voltage battery image G21 and the air conditioner image G26b. Since the arrow image Y attached to the linear image L4b points to the air conditioner image G26b from the high-voltage battery image G21, the user understands that electric power is being supplied to the air conditioner 26b from the high-voltage battery 21.

As shown in FIG. 5C, when electric power is being consumed by the air conditioner 26b and the output terminal 26c, the air conditioner image G26b and output terminal image G26c of the power consumption section image G26 are displayed. And, the linear images L1, L3b connect between the charging device image G40 and the air conditioner image G26b, and the linear images L1, L3c connect between the charging device image G40 and the output terminal image G26c. Since the arrow images Y attached to the linear images L1, L3b, L3c point to the air conditioner image G26b and the output terminal image G26c from the charging device image G40, the user understands that electric power is being supplied to the air conditioner 26b and the output terminal 26c from the external charging facility 40.

In addition, the linear image L4c connects between the high-voltage battery image G21 and the output terminal image G26c. Since the arrow image Y attached to the linear image L4c points to the output terminal image G26c from the high-voltage battery image G21, the user understands that electric power is being supplied to the output terminal 26c from the high-voltage battery 21.

As shown in FIG. 5D, when electric power is being consumed by the air conditioner 26b and the output terminal 26c, the air conditioner image G26b and the output terminal image G26c of the power consumption section image G26 are displayed. And, the linear images L1, L3b connect between the charging device image G40 and the air conditioner image G26b, and the linear images L1, L3c connect between the charging device image G40 and the output terminal image G26c. The arrow images Y attached to the linear images L1, L3b, L3c point to the air conditioner image G26b and the output terminal image G26c from the charging device image G40, the user understands that electric power is being supplied to the air conditioner 26b and the output terminal 26c from the external charging facility 40.

Further, the linear image L4b connects between the high-voltage battery image G21 and the air conditioner image G26b, and the linear image L4c connects between the high-voltage battery image G21 and the output terminal image G26c. The arrow image Y attached to the linear image L4b points to the air conditioner image G26b from the high-voltage battery image G21, and the arrow image Y attached to the linear image L4c points to the output terminal image G26c from the high-voltage battery image G21. Therefore, the user understands that electric power is being supplied to the air conditioner 26b and the output terminal 26c from the high-voltage battery 21.

In this manner, when in the case that electric power from the external charging facility 40 is being supplied to the vehicle 1, not only electric power from the external charging facility 40 is being supplied to the power consumption section 26, but also electric power from the high-voltage battery 21 is being supplied to the power consumption section 26, the display control section 51 displays on the display section 52 that electric power supplied from the external charging facility 40 and electric power supplied from the high-voltage battery 21 is being consumed by the power consumption section 26.

Next, alternative display methods of the linear images will be described. In the above description, the power supply directions are indicated by the arrow images Y attached to the linear images L1, L2, L3, L4 in a solid line, but not limited thereto. For example, the linear images may be displayed in a dotted or dashed line. Moreover, flashing of the linear images may show the state that electric power is being supplied.

Figure 6A:
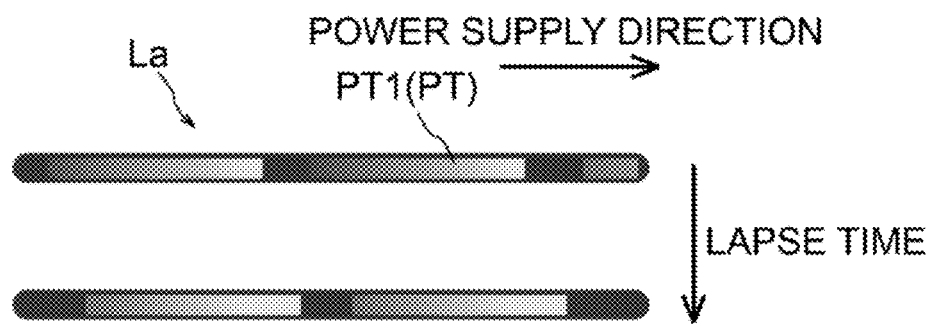
FIG. 6A is a view of an example of a linear image in a solid line with a pattern that is changed continually in color along a power supply direction.
Figure 6B:
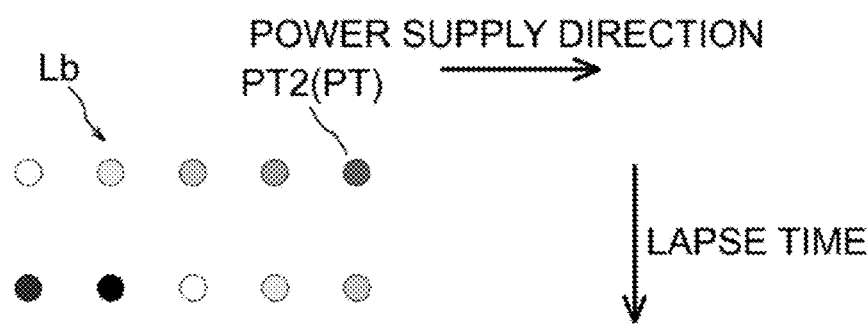
FIG. 6B is a view of an example of a linear image in a dotted line with a pattern that is changed continually in color along a power supply direction.
Figure 6C:
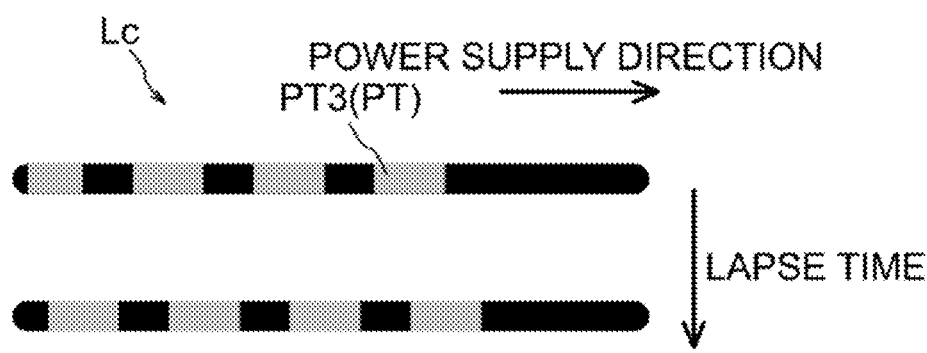
FIG. 6C is a view of an example of a linear image in a solid line with a pattern that is changed intermittently and periodically in color along a power supply direction.

Further, a patterned linear image may be configured to move along the direction indicating the power supply direction. FIGS. 6A to 6C are views of examples of patterned linear images. FIG. 6A illustrates a linear image La in a solid line with a pattern PT1 that is continually changed in color along the power supply direction. FIG. 6B illustrates a linear image Lb in a dotted line with a pattern PT2 that is continually changed in color along the power supply direction. FIG. 6C illustrates a linear image Lc in a solid line with a pattern PT3 that is intermittently and periodically changed in color along the power supply direction. In these linear images La, Lb, Lc, the attached patterns move in the power supply direction (namely, in the right direction in the figures) with lapse of time. It should be noted that the change in color here means one or more changes in brightness, saturation and hue in color.

Figure 7:
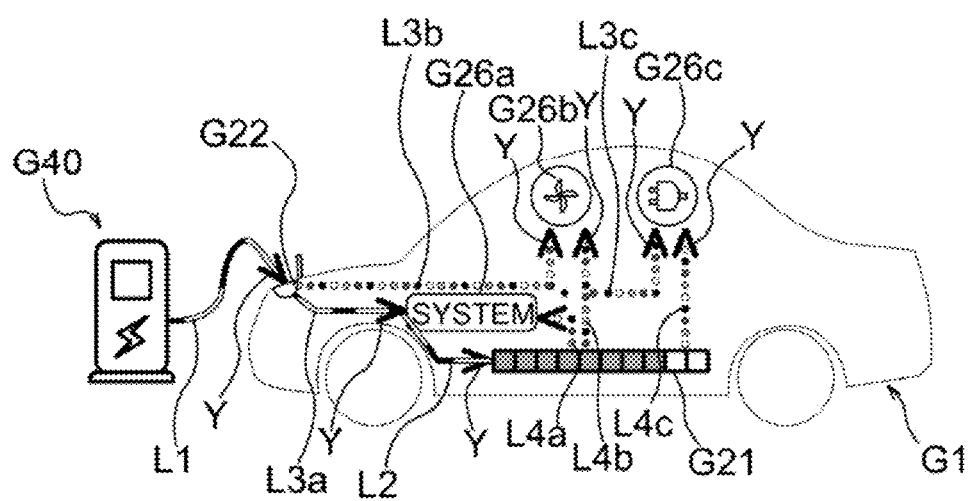
FIG. 7 is a view of an example of plural kinds of linear images.

FIG. 7 is a view of an example using plural kinds of linear images. In this figure, all the linear images L1, L2, L3, L4 are shown for the purpose of exemplary description. As shown in FIG. 7, the patterns of the linear images L1, L2 connecting from the charging device image G40 to the high-voltage battery image G21 may be configured to be different from the pattern of the linear image L3 connecting from the connecting port image G22 to the power consumption section image G26 and the pattern of the linear image L4 connecting from the high-voltage battery image G21 to the power consumption section image G26. In this manner, the differentiation between the patterns of the linear images L1, L2 indicating the power path for charging power and the patterns of the linear images L3, L4 indicating the power path for consuming power allows the user to recognize the difference between the state of power charging and the state of power consumption.

Moreover, two of the linear images may be displayed so as to partially overlap. For example, in FIG. 7, the linear image L2 and the linear image L3a overlap partially with each other. And, the linear image L3b and the linear image L3c overlap partially with each other. In the case of a greater number of linear images, for example, in the case that the power consumption section 26 includes more kinds of on-vehicle auxiliary apparatuses, etc., the partial overlapping of the plural linear images enables a simple display. This allows the user to easily recognize the charging state.

As described above, according to the capacitor state display device 50 for the vehicle of this embodiment, the displaying of the electric power supplied from the external charging facility 40 being consumed by the power consumption section 26 in the state that electric power is being supplied from the external charging facility 40 to the vehicle 1 allows the user to recognize that electric power supplied from the external charging facility 40 is being consumed by the power consumption section 26. In general, in the state that the external charging facility 40 is supplying power, the user tends to think that most of the electric power supplied from the external charging facility 40 is being consumed for charging the high-voltage battery 21. Here, the displaying of the electric power supplied from the external charging facility 40 being consumed by the power consumption section 26 allows the user to recognize that the electric power from the external charging facility 40 is being consumed in the power consumption section 26, but not used only for charging the high-voltage battery 21. Therefore, the user can accurately grasp the state of the high-voltage battery 21.

Further, in this embodiment, the display control section 51 displays that the high-voltage battery 21 is being charged with no electric power supplied from the external charging facility 40 in the state that electric power is being supplied to the vehicle 1 from the external charging facility 40. This can inform the user of no progress in charging of the high-voltage battery 21 in spite that the external charging facility 40 and the high-voltage battery 21 are connected electrically and electric power is being supplied to the vehicle 1 from the external charging facility 40, for example, in the case of no increase in the residual capacity of the high-voltage battery 21 because of a large power consumption in the power consumption section 26.

Moreover, in this embodiment, the display control section 51 displays that in the state that electric power is being supplied to the vehicle 1 from the external charging facility 40, the electric power supplied from the external charging facility 40 and electric power supplied from the high-voltage battery 21 is being consumed by the power consumption section 26, and the high-voltage battery 21 is not charging. This allows the user to recognize no progress in charging of the high-voltage battery 21 as the power consumption section 26 is consuming electric power not only of the external charging facility 40 but also of the high-voltage battery 21, in spite that the external charging facility 40 and the high-voltage battery 21 are connected electrically and electric power is being supplied to the vehicle 1 from the external charging facility 40, for example, in the case of a significantly large power consumption in the power consumption section 26.

Further, in this embodiment, when electric power is being consumed by the power consumption section 26, it is indicated that a specific one of the electric controller 26a, the air conditioner 26b and the output terminal 26c is consuming the electric power. This allows the user to grasp specifically which one of the power consumption section is consuming the electric power.

Moreover, in this embodiment, the high-voltage battery 21 as the element for storing electric power, the external charging facility 40 as the element for supplying electric power for charging the high-voltage battery 21 and the power consumption section 26 as the element for consuming electric power for charging the high-voltage battery 21 are displayed on the display section 52 respectively as the element images of the charging facility image G40, the high-voltage battery image G21 and the power consumption section image G26. In addition, the linear images L1, L2, L3 connect between each two of the element images. In this manner, the displaying of the power supply path on the display section 52 can visually show the user the power supply path.

Moreover, in this embodiment, the power consumption section image G26 includes the electric controller image G26a, the air conditioner image G26b and the output terminal image G26c. In this manner, the displaying of a specific image of the power consumption section image G26 corresponding to a specific element of the power consumption section 26 on the display section 52 can visually show the user which specific element of the power consumption section 26 is consuming electric power.

Further, in this embodiment, the flashing of the linear images in order to show the state that electric power is being supplied can draw the user's attention to these linear images. This allows the user to easily grasp a power supply direction.

Moreover, in this embodiment, the arrow images Y are attached to the linear images L1, L2, L3, L4 in order to indicate that electric power is being supplied. Then, the user call easily gasp the power supply state according to which direction indicated by the arrow images Y.

In addition, in the above-described embodiment, the pattern PT is attached to the linear image so as to move along the power supply direction, whereby the user can recognize that electric power is supplied to the direction in which the pattern moves, and thus can easily grasp the power supply direction.

Moreover, in the above-described embodiment, the pattern PT may be the patterns PT1, PT2, PT3 that are changed in color along the direction indicating the power supply direction. Thus, the patterns that are changed in color along the direction indicating the power supply direction can raise the visibility of the linear image compared to one without any pattern.

In the above-described embodiment, the pattern PT may be the patterns PT1, PT2, PT3, one or more of whose brightness, saturation and hue is/are changed along the direction indicating the power supply direction. Thus, the attachment of the pattern, one or more of whose brightness, saturation and hue is/are changed along the direction indicating the power supply direction, to the linear image can raise the visibility of the linear image compared to one without any pattern.

Further, in this embodiment, the vehicle image G1 is displayed so that the linear images L1, L2, L3 connecting from the charging device image G40 to the high-voltage pattern image G21 or to the power consumption section image G26 go from outside to inside of the vehicle image G1. This can represent visually how electric power is supplied from the external charging facility 40 outside the vehicle 1 to the high-voltage battery 21 or to the power consumption section 26 inside the vehicle 1.

Further, in this embodiment, the connecting port image G22 imitating connecting port 22 is displayed. This can represent visually how electric power is supplied from outside to inside of the vehicle 1.

Further, in this embodiment, the high-voltage battery image G21 is changed in color and pattern according to whether the high-voltage battery 21 is charging or discharging. This allows the user to easily recognize whether the high-voltage battery 21 is charging.

Further, in this embodiment, the power consumption section image G26 indicating the power consumption section 26 is displayed only when a power consumption in the power consumption section 26 is a predetermined amount or more. Thus, if one can say that there is a small power consumption in the power consumption section 26 and no influence on charging of the high-voltage battery 21, the user can be unconscious of electric power being consumed by the power consumption section 26.

In addition, in this embodiment, the information D1 of the time required for completing charging of the high-voltage battery is displayed when the high-voltage battery 21 is charging. This can show the charging state of the high-voltage battery 21 from a temporal point of view, whereby the user can recognize the state of the high-voltage battery more in detail.

In addition, in this embodiment, the information D2 of the residual capacity of the high-voltage battery 21 is displayed. This enables numerical recognition of the residual capacity of the high-voltage battery 21 and more detailed recognition of the state of the high-voltage battery 21.

Further, in this embodiment, the information D3 of the travelable distance of the vehicle 1 if the motor 3 is driven by the electric power of the high-voltage battery 21 is displayed. This enables recognition of the residual capacity of the high-voltage battery 21 from a viewpoint of distance and more detailed recognition of the state of the high-voltage battery 21.

While one embodiment of the present invention has been described above, the invention is not limited to the above-mentioned embodiment but various modifications are possible within the scope of the technical idea as defined in the claims, the specification, and the drawings.

In the above-described embodiment, the hybrid automobile is shown as an example of the vehicle 1, but not limited thereto. The present invention is applicable also to an electric automobile that runs by driving the motor with electric power of the high-voltage battery.

In the above-described embodiment, each information D1, D2, D3, Da, Db, Dc is indicated in texts, but not limited thereto. For example, each information D1, D2, D3, Da, Db, Dc may be indicated by images such as icons. In addition, each of the element images is displayed as images such as icons, but not limited thereto. It may be shown in texts. Moreover, it is not necessary to display the above information and element images either in texts or images. They may be provided both in texts and images.

What is claimed is:

1. A capacitor state display device for a vehicle comprising:
    a capacitor to which electric power is supplied from an external charging facility; and
    a power consumption section consuming electric power supplied from the external charging facility or the capacitor,
    wherein the capacitor state display device for the vehicle has a display control section acquiring a state of the capacitor in the vehicle and a display section displaying images on the basis of a command from the display control section,
    wherein the vehicle has a connecting port electrically connecting between the external charging facility and the capacitor or the power consumption section,
    wherein a connecting port image imitating the connecting port and an outlet cable image imitating an outlet cable are displayable on the display section,
    wherein if electric power supplied from the external charging facility is being supplied to the power consumption section in a state that electric power is being supplied to the vehicle from the external charging facility, the display control section displays that electric power supplied from the external charging facility is being consumed by the power consumption section, and
    wherein in a state that the outlet cable is connected to the connecting port prior to electric supply from the external charging facility, the display control section displays the outlet cable image connected to the connecting port image and the information that the outlet cable is being connected to the connecting port.

2. The capacitor state display device for the vehicle according to claim 1, wherein if electric power supplied from the external charging facility is not being supplied to the capacitor in the state that electric power is being supplied to the vehicle from the external charging facility, the display control section displays on the display section that the capacitor is being not charged with electric power supplied from the external charging facility.

3. The capacitor state display device for the vehicle according to claim 1, wherein if electric power from the external charging facility is being supplied to the power consumption section and electric power from the capacitor is being supplied to the power consumption section in the state that electric power is being supplied to the vehicle from the external charging facility, the display control section displays on the display section that electric power supplied from the external charging facility and electric power supplied from the capacitor is being consumed by the power consumption section and the capacitor is not charging.

4. The capacitor state display device for the vehicle according to claim 1,
    wherein the power consumption section includes at least one of an electric controller for electrically controlling the vehicle, an air conditioner arranged in the vehicle and an output terminal connectable to an external electrical apparatus, and
    wherein the display control section displays on the display section, which of the power consumption section, the electric controller, the air conditioner and the output terminal is consuming electric power.

5. The capacitor state display device for the vehicle according to claim 1,
    wherein a first element image imitating the external charging facility, a second element image imitating the capacitor, a third element image imitating the power consumption section, and a linear image in a solid or dotted line connecting between two of the element images of the first element image, the second element image and the third element image are displayable on the display section, and
    wherein the display control section indicates a power supply path by displaying the linear image between each two of the element images on the display section.

6. The capacitor state display device for the vehicle according to claim 5,
    wherein the power consumption section includes at least one of the electric controller for electrically controlling the vehicle, the air conditioner arranged in the vehicle and the output terminal connectable to the external electrical apparatus, and
    wherein the third element image includes at least one of an electric controller image indicating the electric controller, an air conditioner image indicating the air conditioner and an output terminal image indicating the output terminal.

7. The capacitor state display device for the vehicle according to claim 5,
    wherein the display control section indicates by flashing the linear image, a state that electric power is being supplied.

8. The capacitor state display device for the vehicle according to claim 5,
    wherein an arrow image is displayable on the display section, and
    wherein the display control section attaches the arrow image to the linear image so that a direction indicated by the arrow image indicates a power supply direction.

9. The capacitor state display device for the vehicle according to claim 5,
    wherein a pattern is attached to the linear image, and wherein the display control section moves the pattern along a direction indicating a power supply direction.

10. The capacitor state display device for the vehicle according to claim 9, wherein the pattern is changed in color along a power supply direction.

11. The capacitor state display device for the vehicle according to claim 10, wherein one or more of brightness, saturation and hue of the pattern is/are changed along a direction indicating a power supply direction.

12. The capacitor state display device for the vehicle according to claim 5,
    wherein a vehicle image imitating the vehicle is displayable on the display section, and
    wherein the display control section displays on the display section, the first element image outside the vehicle image so that the linear image connecting between the first element image and the second element image or the third element image goes from outside to inside of the vehicle image.

13. The capacitor state display device for the vehicle according to claim 12,
    wherein the display control section displays the connecting port image on the display section so that the linear image connecting between the first element image and the second element image or the third element image goes through the connecting port image.

14. The capacitor state display device for the vehicle according to claim 5,
    wherein the second element image is changeable partially or wholly in color or pattern, and
    wherein the display control section changes the second element in color or pattern according to whether the capacitor is charging or discharging.

15. The capacitor state display device for the vehicle according to claim 5,
    wherein the third element image is switchable between display and non-display, and
    wherein the display control section displays the third element image on the display section if a power consumption in the power consumption section is a predetermined amount or more.

16. The capacitor state display device for the vehicle according to claim 1, wherein if the capacitor is being charged with electric power supplied from the external charging facility, the display control section displays on the display section, information of time required for completing charging of the capacitor.

17. The capacitor state display device for the vehicle according to claim 1, wherein the display control section displays on the display section, information of residual capacity of the capacitor.

18. The capacitor state display device for the vehicle according to claim 1,
    wherein the vehicle has an electric motor, and
    wherein the display control section displays on the display section, information of a travelable distance of the vehicle if the electric motor is driven by electric power of the capacitor.

* * * * *